(12) United States Patent
Chiou et al.

(10) Patent No.: US 9,049,276 B2
(45) Date of Patent: Jun. 2, 2015

(54) METHOD AND SYSTEM FOR PROVIDING NETWORK ANALYSIS OF A HYBRID TELEPHONY NETWORK

(75) Inventors: Gou-Shiow (Amy) Chiou, Plano, TX (US); Lulia A. Barakat, McKinney, TX (US); Bob Artman, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1572 days.

(21) Appl. No.: 12/266,196

(22) Filed: Nov. 6, 2008

(65) Prior Publication Data
US 2010/0115416 A1 May 6, 2010

(51) Int. Cl.
| | |
|---|---|
| *G06F 15/177* | (2006.01) |
| *G06F 15/173* | (2006.01) |
| *G01R 31/08* | (2006.01) |
| *G06F 3/00* | (2006.01) |
| *H04M 7/00* | (2006.01) |
| *H04L 12/24* | (2006.01) |
| *H04M 3/00* | (2006.01) |
| *H04Q 3/00* | (2006.01) |
| *H04L 29/08* | (2006.01) |

(52) U.S. Cl.
CPC ............. *H04M 7/0081* (2013.01); *H04L 12/24* (2013.01); *H04M 3/00* (2013.01); *H04Q 3/0045* (2013.01); *H04Q 3/0062* (2013.01); *H04L 67/34* (2013.01)

(58) Field of Classification Search
USPC .......... 709/220, 223, 224; 370/230, 232, 346; 715/700, 738
See application file for complete search history.

(56) References Cited

U.S. PATENT DOCUMENTS

| 5,790,551 | A | * | 8/1998 | Chan | 370/458 |
| 6,125,117 | A | * | 9/2000 | Martin et al. | 370/397 |
| 7,068,644 | B1 | * | 6/2006 | McConnell et al. | 370/352 |
| 7,752,301 | B1 | * | 7/2010 | Maiocco et al. | 709/224 |
| 2006/0221876 | A1 | * | 10/2006 | Kosanovic et al. | 370/286 |

* cited by examiner

*Primary Examiner* — Ninos Donabed
*Assistant Examiner* — Farrukh Hussain (57) ABSTRACT

An approach is provided for analyzing a hybrid telephony network. A plurality of nodes within a network is polled for configuration information, wherein the nodes are configured to establish packetized voice sessions. The configuration information is correlated. A view of the nodes and associated circuits is presented to a user for configuring one or more of the nodes based on the correlation.

16 Claims, 14 Drawing Sheets

METHOD AND SYSTEM FOR PROVIDING NETWORK ANALYSIS OF A HYBRID TELEPHONY NETWORK

BACKGROUND INFORMATION

Modern communication networks are growing in size and complexity. The convergence of voice and data applications and services continues to fuel the popularity of the global Internet. For example, use of Voice Over Internet Protocol (VoIP) has become a viable alternative to plain old telephone service (POTS) over traditional circuit-switched telephony systems. Furthermore, as the number and types of equipment used to provide VoIP applications increases, the process of provisioning and tuning communication systems becomes more complex. Traditional procedures for provisioning services in a circuit-switched environment lack applicability to packetized voice system, which has a distributed switching architecture. Consequently, ad hoc methods have developed, involving manually intensive tasks in configuring these packetized voice systems.

Therefore, a mechanism is needed to efficiently provide network analysis and configuration for packetized voice networks.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for providing automated data collection and analysis for provisioning packetized voice services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a Voice over Internet Protocol (VoIP) network providing long distance services, it is contemplated that these embodiments have applicability to any equivalent protocol and services.

Figure 1A:
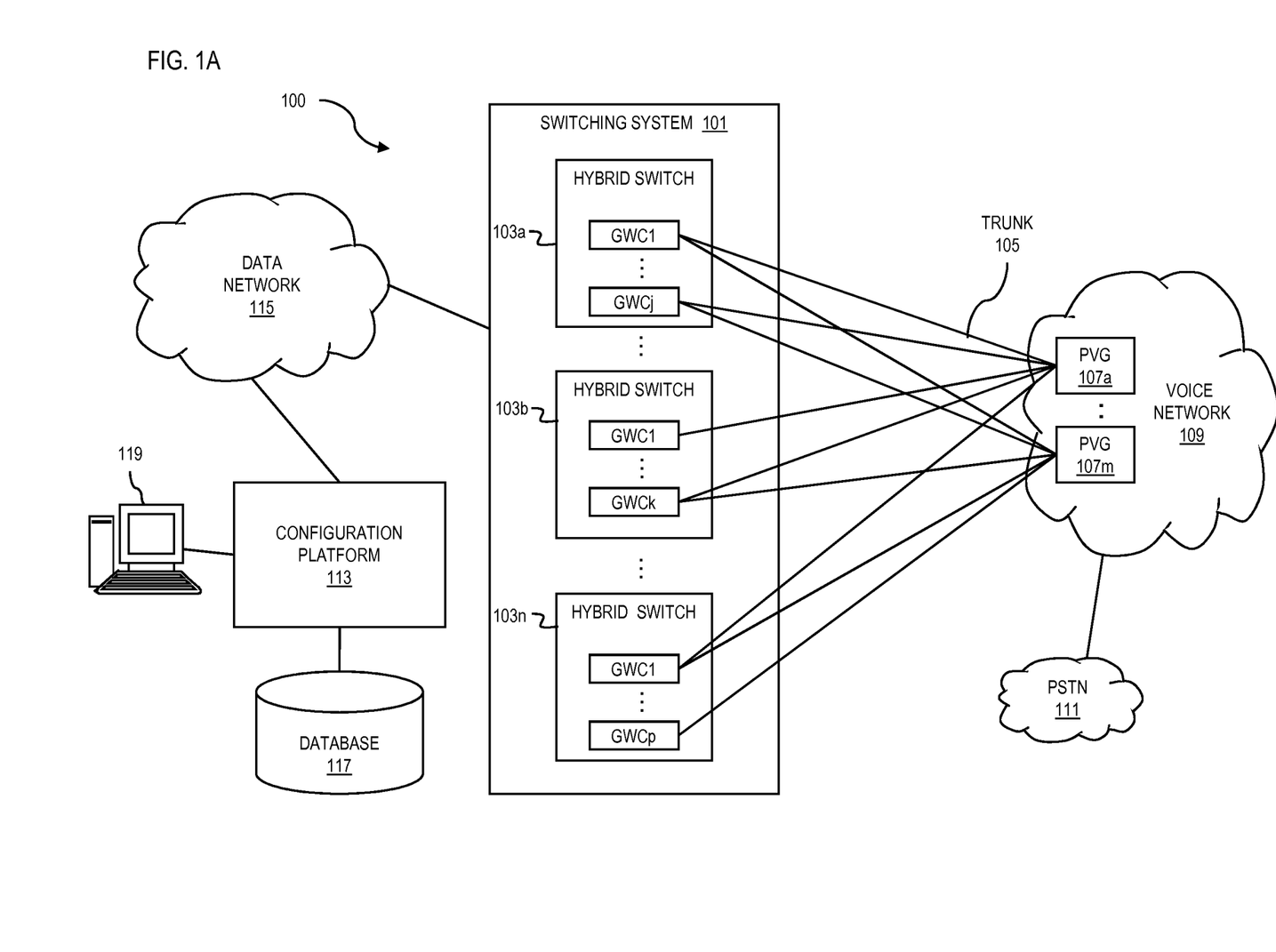
FIG. 1 is a diagram of a system capable of automated collection and analysis of provisioning data, according to various exemplary embodiments.

FIG. 1 is a diagram of a system capable of automated collection and analysis of provisioning data, according to various exemplary embodiments. A communication system 100 includes a switching system 101 for providing, in certain embodiments, packetized voice communications. The switching system 101 utilizes multiple switches 103a-103n deployed according to a distributed architecture to provide a variety of communication services, such a long distance voice communication. The system 101 can include a traditional Time-Division Multiplexing (TDM) switch, a VoIP switch, or a hybrid switch that provides both types to facilitate end terminals' establishing voice sessions. In this example, the switching system 101 provides hybrid switches 103a-103n to implement Voice over Internet Protocol (VoIP). In part because of the distributed nature of switching system 101, the provisioning of services traditionally is inefficient and manually intensive. Understandably, the provisioning systems and processes, which have been optimized for traditional telephony systems, have not been adapted to keep pace with newly developed technologies.

With conventional handling of voice communication services, typically a single switch element was involved. Hence, in general only a single switch is inspected and configured during the provisioning of new services or modifying existing services. As mentioned, modern switch equipment involves multiple elements, thereby complicating the provisioning process. As such several switching elements need to be investigated during, for example, the provisioning process. Furthermore, in this example, the system 100 provides VoIP enabled Public Switched Telephone Network (PSTN) long distance (LD) service, using multiple (e.g., three) classes of switching equipment. Such equipment are to be provisioned and turned up together. Moreover, as seen in FIG. 1, the switches 103a-103n, being distributed, do not communicate with each other in a way that is conducive for provisioning. As the number of elements increase, the task of provisioning increases in complexity and becomes more time consuming.

By way of example, each of the switches 103a-103n includes one or more gateway controllers (GWCs). In one embodiment, a GWC is responsible for the registration and management of resources of one or more packet voice gateway (PVGs) 107a-107m, which translate TDM calls to VoIP signaling and vice versa. The GWC receives signaling information (e.g., dialed digits) from the gateway 107a-107m over corresponding trunks 105 and can instruct the gateway 107a-107m to alert the called party, to send and receive voice data, etc.

A trunk 105 is a communication path connecting two switching systems or nodes in a network. A set of trunks that are traffic engineered as a unit in order to establish connections between switching systems (in which all of the communication paths are interchangeable) is referred to as a trunk-group.

As an example of the distributed nature of the switching system 101, switches 103a-103n may be located in geographically dispersed location than that of the PVGs 107a-107m. For instance, the switches 103a-103n may be situated in Dallas, Tex. while PVGs 107a-107m are located in Oklahoma City, Okla.

The approach of system 100, according to certain embodiments, stems from the recognition that provisioning and/or configuring system 100 is highly complex. The PVGs 107a-107m provide access to a voice network 109, which can be a circuit-switched voice network, and ultimately interface a Public Switched Telephone Network (PSTN). As necessary, a PVG (e.g., PVG 107) converts between different transmission and coding techniques. With respect to provisioning or troubleshooting, a user (e.g., system administrator, engineer, representative, etc.) in charge of provisioning should have knowledge of the particular PVGs that they should be logged on to for gathering of relevant information.

According to certain embodiments, a configuration platform 113 addresses the drawbacks of provisioning and configuration associated with switches that provide packetized voice communications. Among other functions, the configuration platform 113 collects data from the switching system 101 over a data network 115 and analyzes such data to provide provisioning. The data can be stored in a database 117 for later processing. The user can access the configuration platform 113 using a computing device 119. This platform 113 polls the classes of equipment for their provisioning configuration data, links the data sets through operational relationships, and provides provisioning and configuration views at varying and selectable levels of granularity (e.g., from DS0, gateway controller, to per element view). The platform 113 additionally allows rapid configuration and provisioning of VoIP enabled LD network services, as well as rapid troubleshooting. The components of the configuration platform 113 are more fully described below with respect to FIG. 2.

Figure 1B:
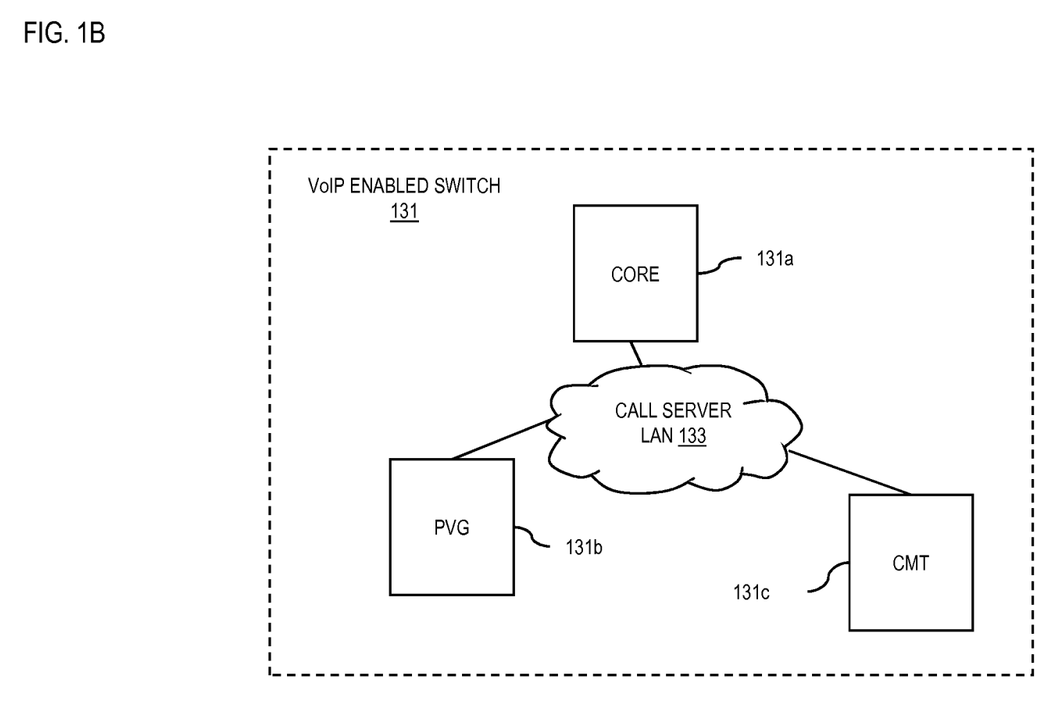

Regarding FIG. 1B, an exemplary VoIP enabled switch 131 can be utilized in the switching system 101. The switch 131 can include a core 131a, a PVG 133a, and a Communication Management Tool (CMT) 131c, which communicate over a call server local area network (LAN) 133. As applied to the system 100, the CMT 131c monitors the communication between the GWCs and the PVGs 107a-107m. The switch 131 can be configured by the configuration platform 113 in response to various requests, e.g., provisioning, troubleshooting, fault recovery, and etc.

Figure 2:
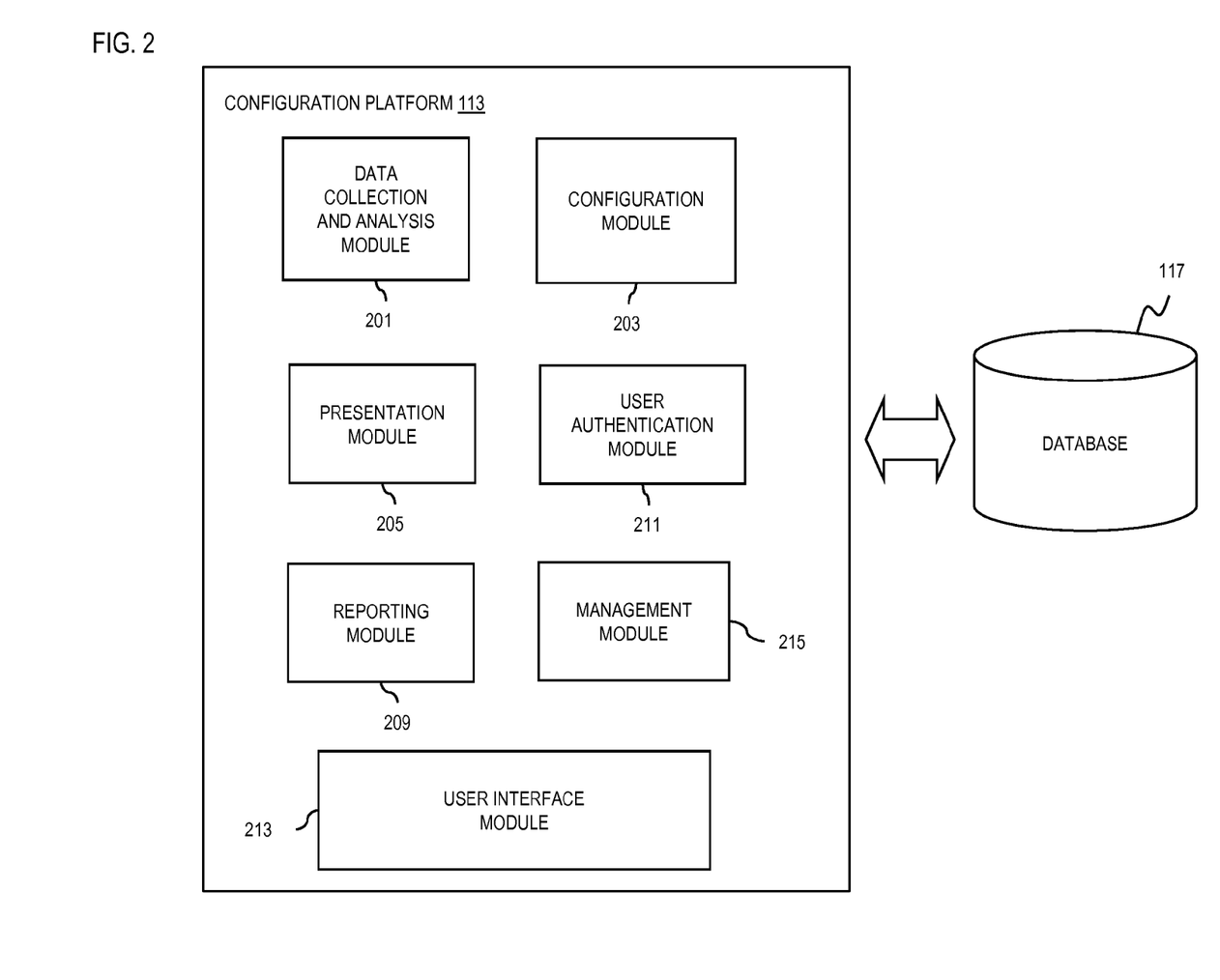
FIG. 2 is a diagram of a configuration platform utilized in the system of FIG. 1, according to an exemplary embodiment.

FIG. 2 is a diagram of a configuration platform utilized in the system of FIG. 1, according to an exemplary embodiment. The platform 113 can download a list of equipment, manage credentials, automatically compile necessary datasets from the equipment, and correlate the datasets to manage of the network 100. For the purposes of illustration, the configuration platform 113 performs network analysis and configuration using the following components: a data collection and analysis module 201, a configuration module 203, a presentation module 205, a reporting module 209, a user authentication module 211, and a user interface module 213. Additionally, the configuration platform 113 may include a management module 215 for providing fault management, configuration management, performance management, and security management.

It is contemplated that these components 201-215 can be combined in various forms, depending on the application. The data collection and analysis module 201 collects data from switching elements (e.g., GWCs, PVGs), and stores the collected information into the database 117. The module 201 also analyzes the data to permit proper configuration of the switching elements. Such configuration can be performed by the configuration module 203.

The presentation module 205 messages the collected data and associated analysis for transmission to the user via, in an exemplary embodiment, a web interface, such as a browser.

The reporting module 209 affords the user the capability to select or design a format for delivery of information. Further, the platform 113 utilizes the user authentication module 211 to ensure that only authorized users an access the switching elements and the configuration platform 113 itself. That is, the user authentication module 211 allows only certain registered users with assigned privileges to conduct data collection and analysis procedures and access the collected data and data analysis results.

Moreover, the user interface module 213 can process input (e.g., requests) from a user, and to relay such input to the appropriate module. For example, the data collection and analysis module 201 can handle queries from the user relating to the analysis of the data.

Figure 3:
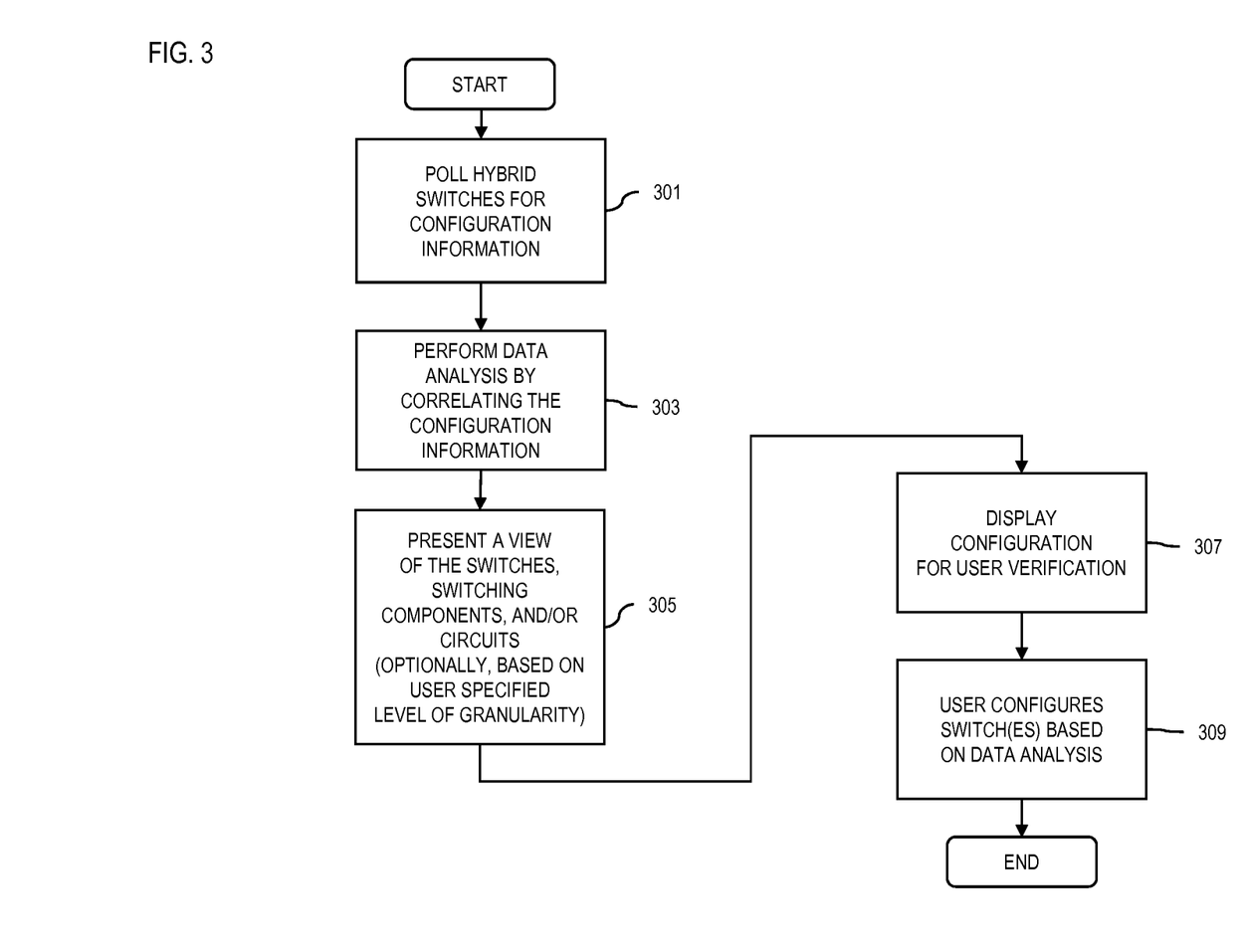
FIG. 3 is a flowchart of a process for configuring the system of FIG. 1, according to an exemplary embodiment.

FIG. 3 is a flowchart of a process for configuring the system of FIG. 1, according to an exemplary embodiment. This process is described, by way of example, with respect to the components of the configuration platform 113 of FIG. 2. In step 301, the data collection and analysis module 201 collects configuration information (e.g., PVC and CMT data) from the switches 103a-103n and associated switching elements by polling the switches 103a-103n; in one embodiment, this information can be stored in an external data store (not shown) or server. That is, required data from various switching elements throughout the network are collected. The data collection and analysis module 201 allows a user to implement a certain schedule (e.g., time) when the data is automatically collected as on demand at any time; moreover, the schedule can be event driven, e.g., when a provisioning request is received.

Next, data analysis is performed, as in step 303, to correlate the collected configuration information. The process then presents, via the presentation module 205, a view of the network 100—i.e., switches 103a-103n, associated switching components, and/or circuits (or trunks)—to a user. In one embodiment, the view is displayed, per step 305, using a graphical user interface (GUI), e.g., a web interface, to the user, who can optionally specify the level of granularity (with respect to the network elements or components) for this view. For example, the user may elect to be informed about the network resources at a component level (e.g., network cards, or line cards). With the web-interface, the user can indicate a desired function, such as provisioning, troubleshooting, etc., that entails reconfiguring the switching system 101.

Thereafter, the user can verify the configuration, per step 307.

In step 309, the switches 103a-103n are configured, by the user via configuration module 203, based on the data analysis and in accordance with parameters associated with the particular function (e.g., service provisioning may specify a certain service level agreement (SLA), bandwidth requirement, etc.).

Figure 4:
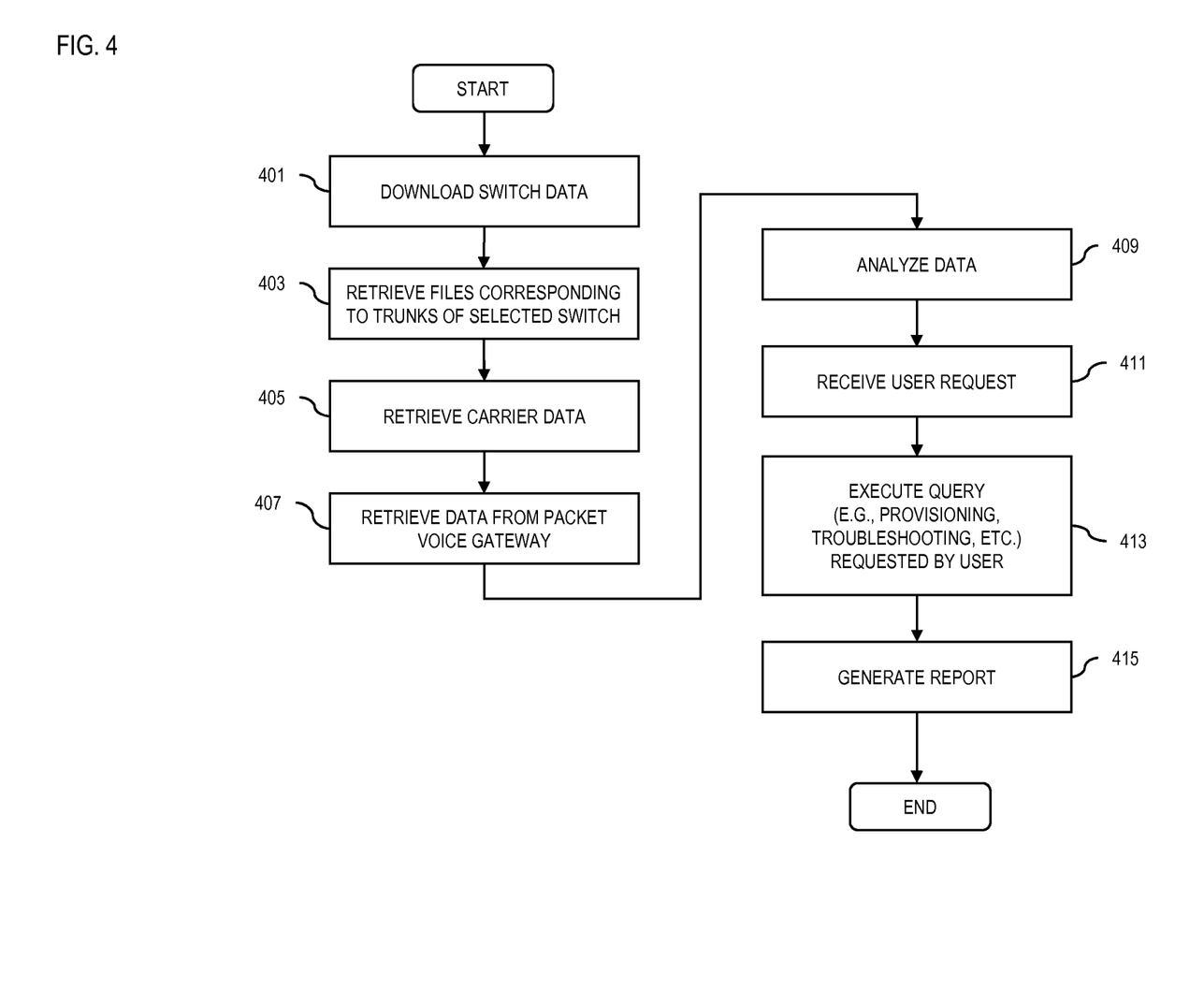
FIG. 4 is a flowchart of a process for collecting and analyzing data to configure the system of FIG. 1 in response to service provisioning or troubleshooting, according to an exemplary embodiment.

FIG. 4 is a flowchart of a process for collecting and analyzing data to configure the system of FIG. 1 in response to service provisioning or troubleshooting, according to an exemplary embodiment. This process is described with respect to the exemplary user interface of FIGS. 5A-5H. In step 401, a user can initiate collection of switch data using screen 501 (denoted "Switch Down Load" screen). The data can be distributed across a multitude of elements: switches 103a-103n, CMT 131c, and gateways 107a-107m. Such data can be stored in database 117 and subsequently queried as necessary.

Figure 5A:
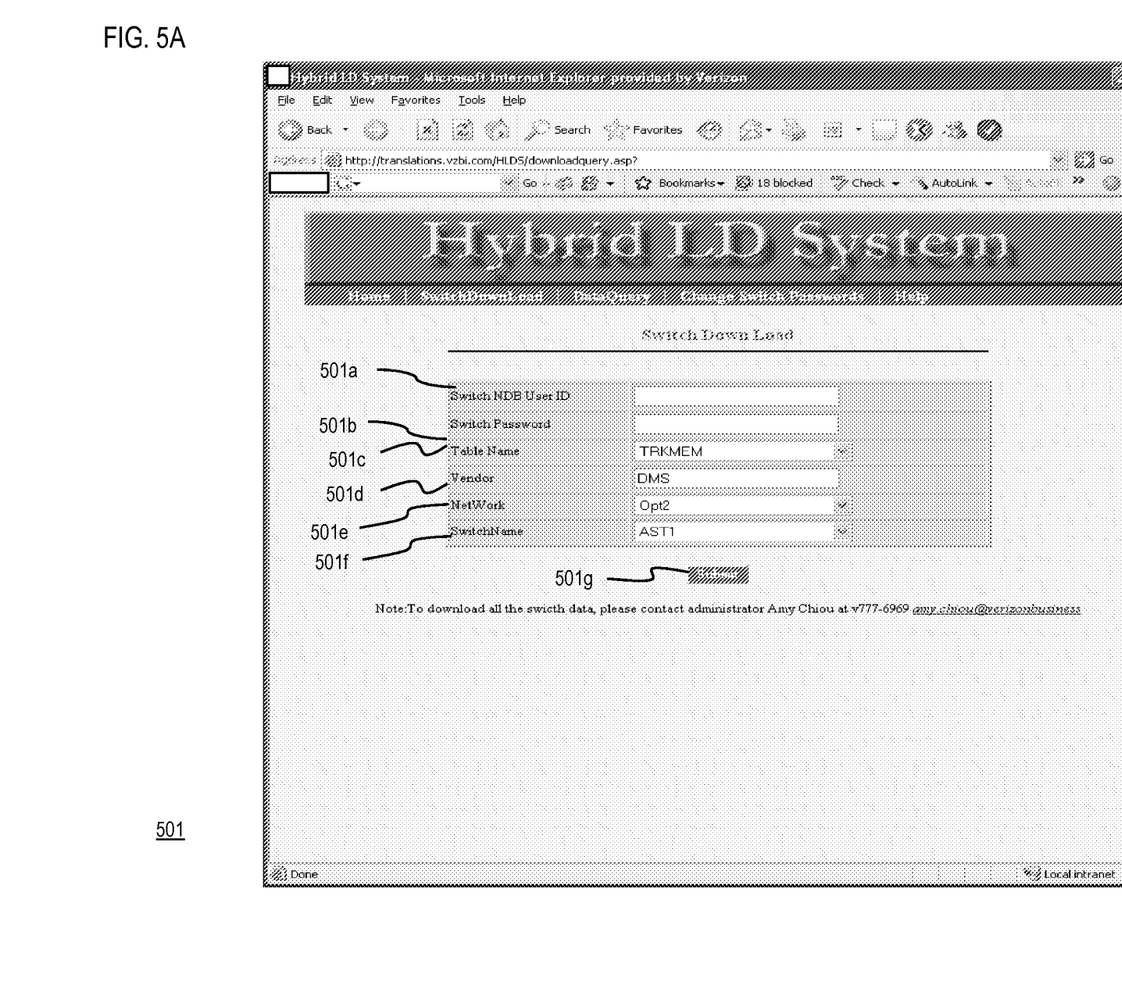
FIGS. 5A-5H are diagrams of exemplary screens of a graphical user interface (GUI) for various services provided by the automated configuration system, according to various exemplary embodiments.
Figure 5B:
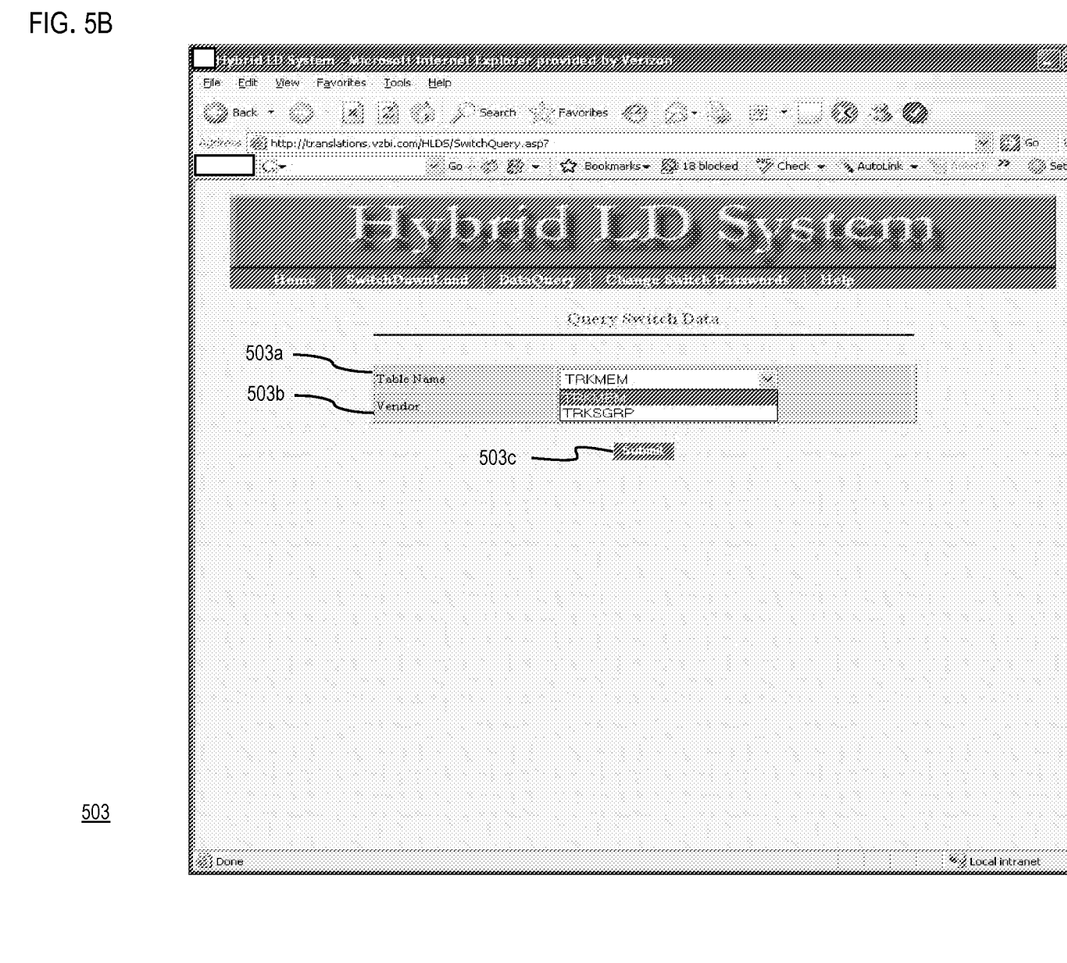
Figure 5C:
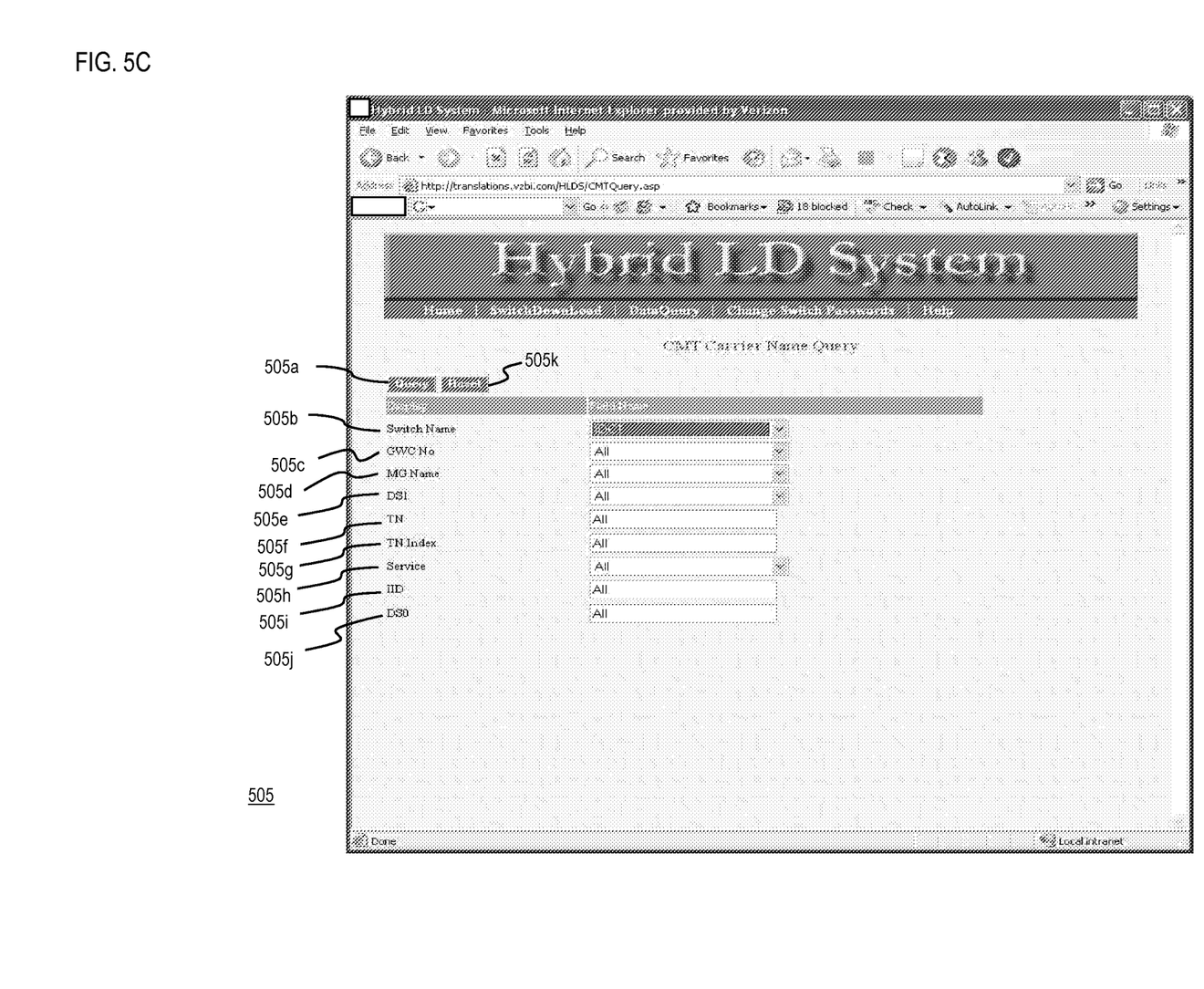
Figure 5D:
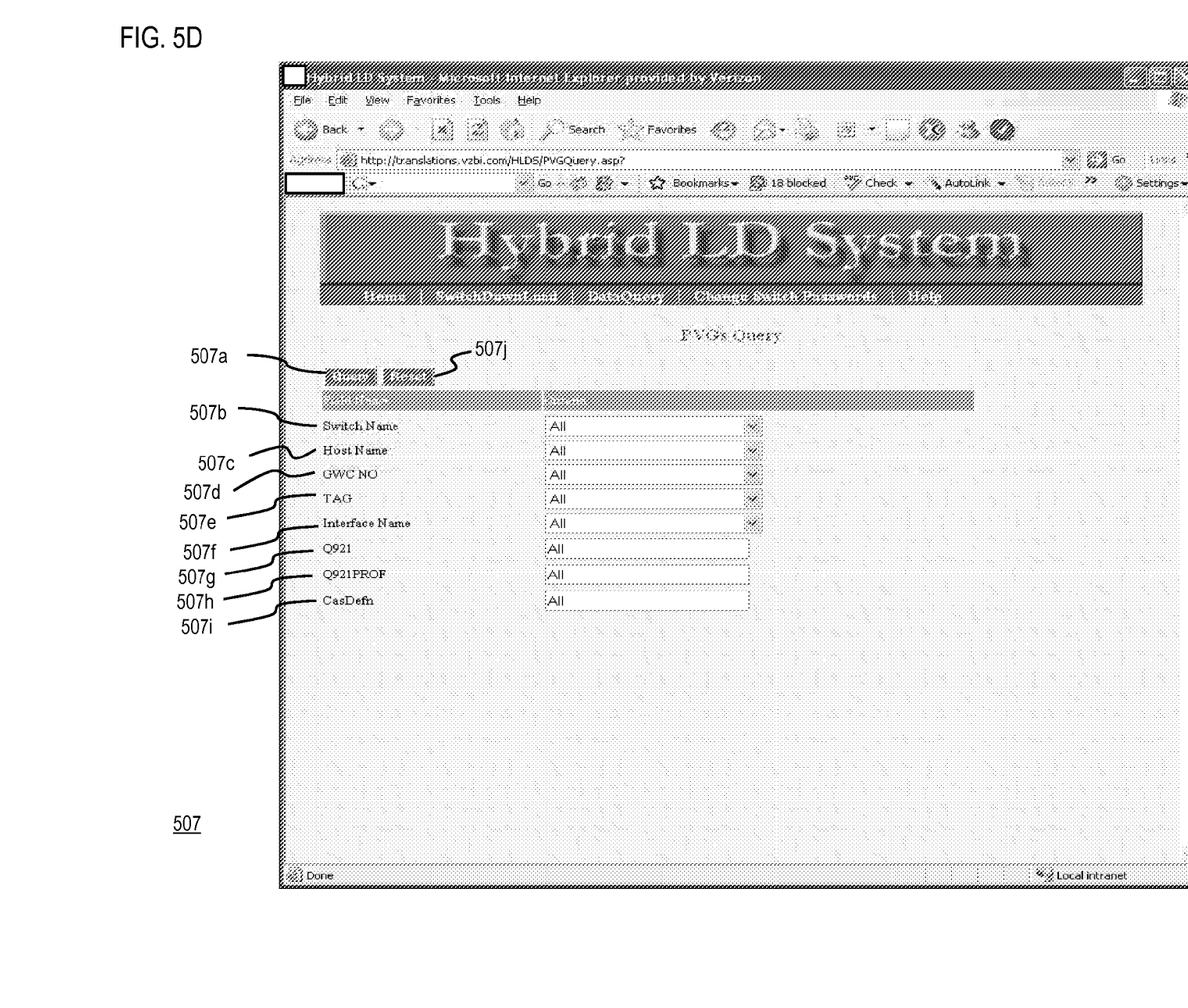
Figure 5E:
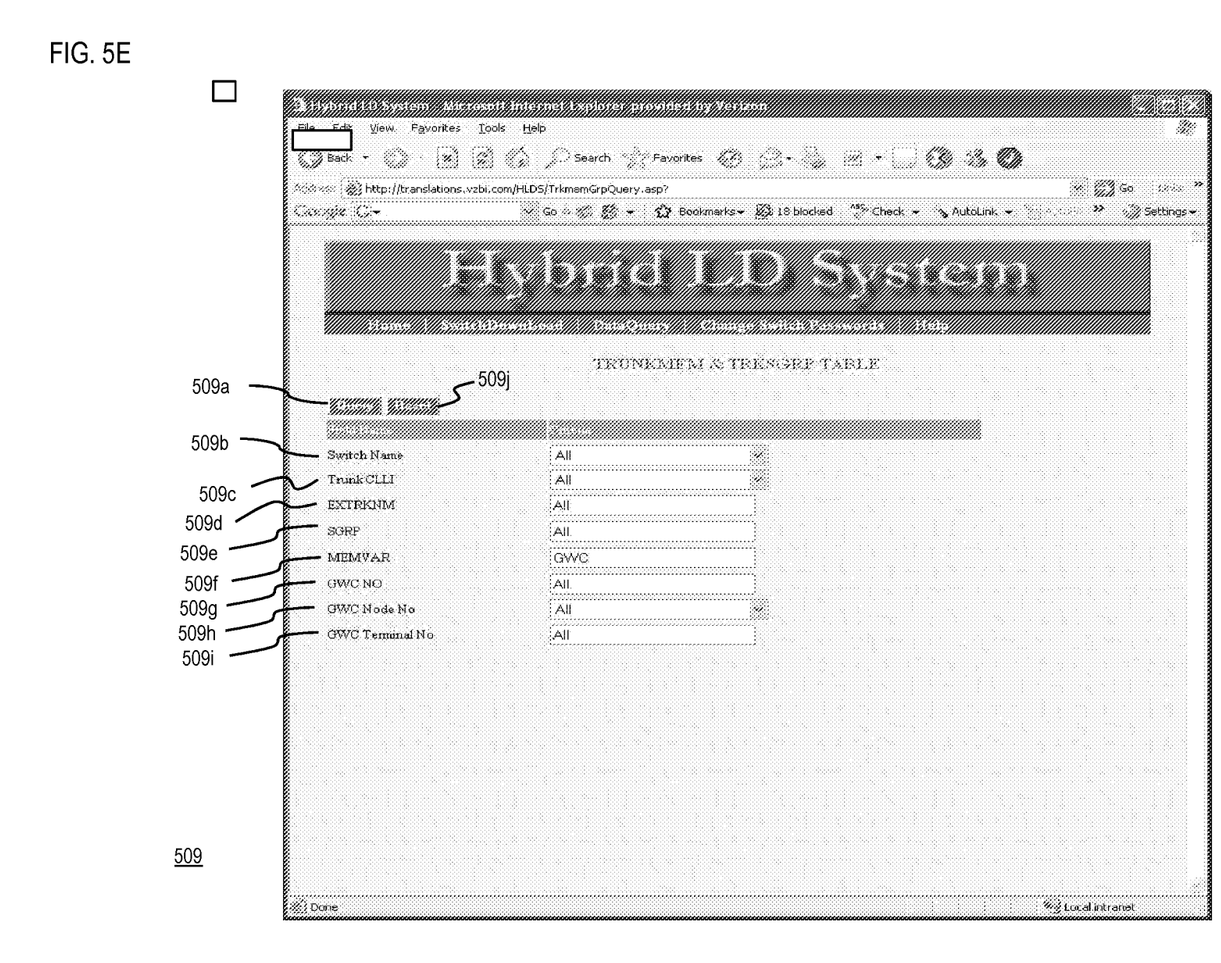

As seen in FIG. 5A, the Switch Down Load screen 501 prompts the user with a Switch User ID section 501a to allow the user to input a user identifier (ID) and associated password per a Switch Password section 501b. For example, this screen 501 permits the user to invoke a download process for the TRKMEM and TRKSGRP data from the core 131a, as well as the carrier data from the CMT 131c. The user ID and password information is used by the platform 113 to access the switching system 101. Screen 501 also provides a Table Name section 501c for the user to indicate the desired information, which in this example pertains to the trunks utilized by the subject switch. In other words, the user can input the desired switch table for download. The user can specify the particular switch through a Vendor section 501d, in which the user can indicate the manufacturer of the switch. Additionally, assuming the switching system 101 spans multiple networks, a Network section 501e permits the user to indicate the network in which the switch resides. Furthermore, screen 501 provides for the capability to specify the name of the switch with a SwitchName section 501f. Upon filling in the relevant information for sections 501a-501f, the user can then submit the query by selecting a Submit button 501g.

Next, in step 403, the platform 113 retrieves information (e.g., entire files) of the trunks associated with the selected switch. This retrieval can be executed using a "Query Switch Data" screen 503 (of FIG. 5B), which provides the ability for the user to view the entire files of, for example, trunk member and subgroups of specific trunk-group tables for a selected switch. "TRKSGRP" lists supplemental information for each subgroup that is assigned to one of the trunk groups list in the table, TRKGRP. Screen 503 permits the user to input a table name with Table Name section 503a, and a vendor with Vendor section 503b. A Submit button 503c submits the query. Thus, the Query Switch Data screen 503 allows viewing of the TRKMEM or TRKSGRP data that have been downloaded into the system. Subsequent screens can request additional information to refine the query.

As part of the data collection, the process can additionally obtain carrier data (step 405) from gateway elements (e.g., CMT 131c) corresponding to the switches 103a-103n. A CMT Carrier Name Query screen 505 allows the user to retrieve carrier information at various levels of hierarchy from the CMT 131c. This process is facilitated by the user interface screen 505 of FIG. 5C. By way of example, the screen 505 includes a Query button 505a to submit the query to collect information about the gateway. To support such query, the following sections are utilized: a Switch Name section 505b for the name of the particular switch, a Gateway Control Number ("GWC No.") section for indicating an identifier for the GWC, a MG Name section 505d for selecting a media gateway, a DS1 section 505e for inputting a particular carrier name at the DS1 level, a TN (terminal number) section 505f for specifying a terminal number, a TN Index section 505g to input a terminal index, a Service section 505h for selecting a service type (e.g., ISUP or PRI), an IID section 505i for specifying an interface ID, and a DS0 section 505j for inputting a particular carrier name at the DS0 level. Screen 505 also provides a Reset button 505k to clear the entries of the sections 505a-505j. It is contemplated that, in addition or in the alternative, circuits other than DS0 (rate of 64 kbps) and DS1 (rate of 1.544 Mbps) can be employed. Depending on the design of the network 100, other rates based on Synchronous Digital Hierarchy (SDH) can be supported, e.g., DS3 (rate of 44.736 Mbps).

In step 407, configuration information associated with the packet voice gateways corresponding to the subject switches are retrieved. Such data collection can be performed using a "PVGs Query" screen 507 of FIG. 5D. The PVGs Query screen 507 allows a user to display the PVG data that is provisioned for a given switch. In this example, a minimum of two entries are selected to indicate the desired data; one of which must be the switch name. As with the CMT Carrier Name Query screen 505, this PVGs Query screen 507 includes a Query button 507a to initiate the data query. Here, the user can indicate various parameters: a SwitchName section 507b for selecting a particular switch of interest, a Host Name section 507c for inputting a host name, a GWC No. section 507d for specifying a gateway controller number, a TAG section 507e for providing a tag name for certain channels, an Interface Name section 507f, a Q921 section 507g for a Q921 value of a D-channel, a Q921PROF section 507h for indicating the value of a D-channel profile, and a CasDefn section 507i for indicating Cas channel AssosSignaling Definition.

Other query screens 509-513 are shown in FIGS. 5E-5H, respectively. Screen 509 (denoted "TRUNKMEM & TRKSGRP TABLE") provides the user with TRUNKMEM data, including, for example, Integrated Services Digital Network (ISDN) D channel information. This screen 509 provides the user, upon selecting a Query button 509a, with the ability to gather information with more granularity using the following sections: Switch Name section 509b, Trunk CLLI (Common Language Location Identifier) section 509c for specifying the location and type of a piece of telecommunications equipment for each carrier, EXTRKNM section 509d for specifying an external trunk number, a SGRP section 509e for inputting a subgroup value (e.g., 0 or 1), a MEMVAR section 509f for specifying a variable name (e.g., GWC for gateway controller), a GWC No. section 509g, a GWC Node No. section 509h, and a GWC Terminal No. section 509i. As with the other query screens, a Reset button 509j is also utilized to easily clear the query input.

Figure 5F:
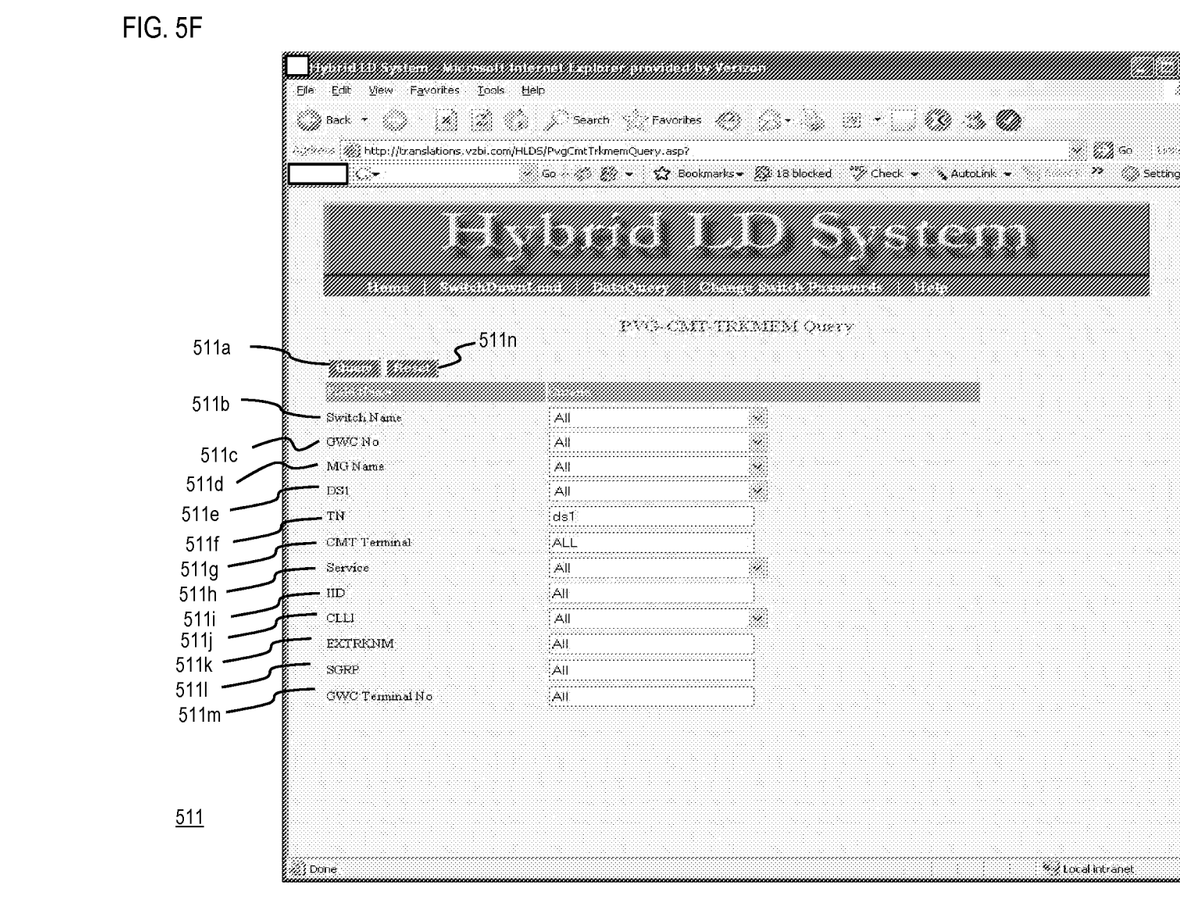
Figure 5G:
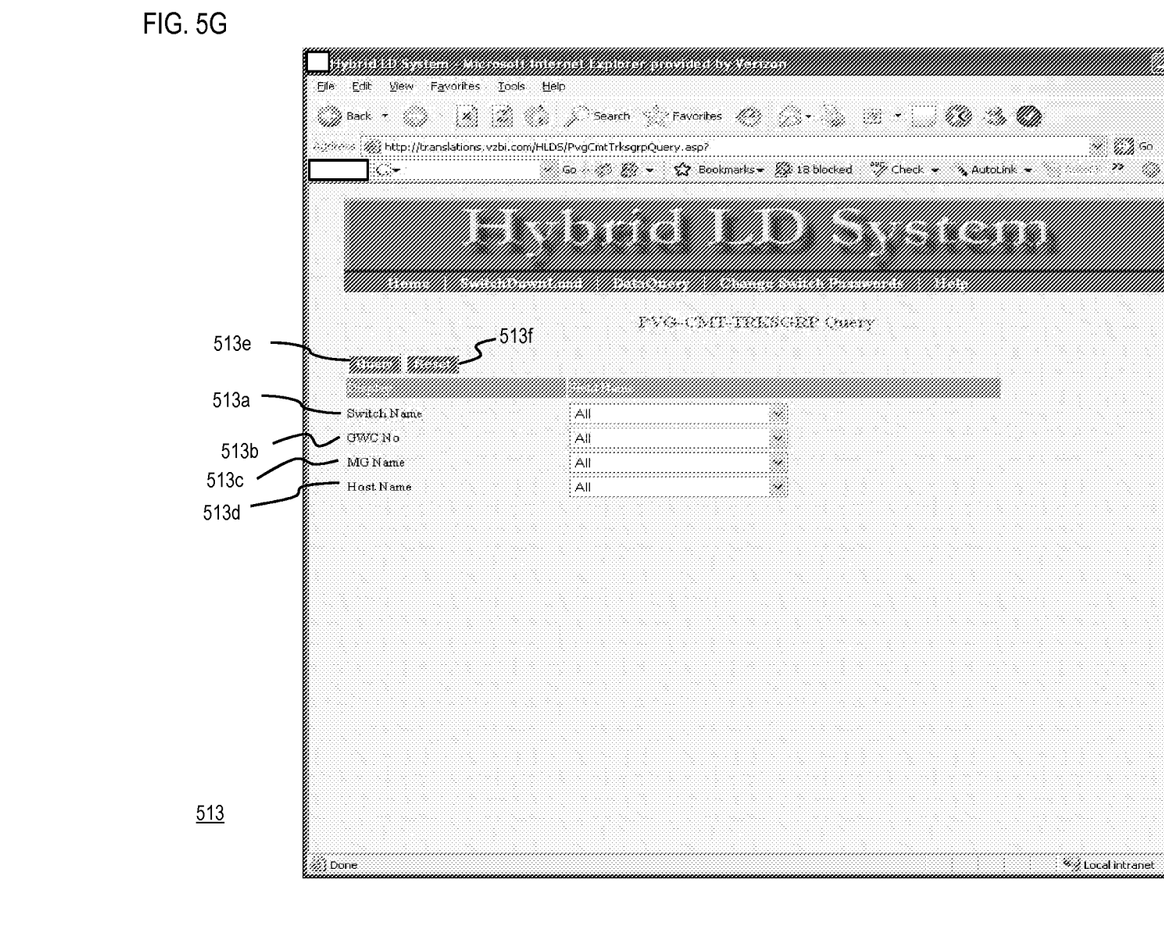

As seen in FIG. 5F, a PVG-CMT TRKMEM Query screen 511, which relates to the core, CMT, and PVG data, includes a Query button 511a for initiating a query, which can be based on the following sections: a Switch Name section 511b, a GWC No. section 511c, a MG Name section 511d, a DS1 section 511e, a TN (terminal number) section 511f, a CMT Terminal section 511g, a Service section 511h, an IID section 511i, a CLLI section 511j, an EXTRKNM section 511k, a SGRP section 511l, and a GWC Terminal No. section 511m. Screen 511 also provides a Reset button 511n.

Moreover, a PVG-CMT-TRKGRP Query screen 513 (FIG. 5G) provides the links among PVG, CMT and TRKSGRP elements, allowing a user to view, e.g., Integrated Services Digital Network (ISDN) records associated with these three elements. This screen 513 displays data relating to the core 131a, CMT 131c, and PVG 131b. A query can be formed using the following fields or sections: a Switch Name section 513a, a GWC No. section 513b, a MG Name section 513c, and a Host Name section 513d. Additionally, screen 513 provides a Query button 513e and a Reset button 513f.

The PVG-CMT-TRKMEM query screen 511 provides the links among PVG, CMT and TRKMEM data elements. The screen 511 thus allows the user to easily find the associated PVG interface, CMT gateway data, and TRKMEM data. Additionally, the user can view the Carrier information from DS1 to DS0 level. Further, the user can view multiple CLLIs for each carrier, and the associated D-channel. Accordingly, the user can analyze the data across the three elements to verify whether the provisioning is correct.

Referring back to the process of FIG. 4, in step 409, the data collected is analyzed. The data analysis process includes finding existing links between the elements of Trunk-mem (the table of Trunk members) and Trunk-groups. This function, for example, can assist the user with provisioning, e.g., Integrated Services Digital Network (ISDN) services (which traditionally required complex coordination among different network elements), whereby the associated Integrated Services Digital Network (ISDN) record can be readily determined in the Trunk-group table.

In step 411, the user can specify a query relating to configuration of the network 100 based on data available in the platform. For instance, the query can be used for provisioning, troubleshooting, fault recovery, etc. The query is then performed, resulting in a display of configuration data of the network 100 (step 413). The results of the query are displayed to the user; for example, this can be in form of a report (step 415).

Figure 5H:
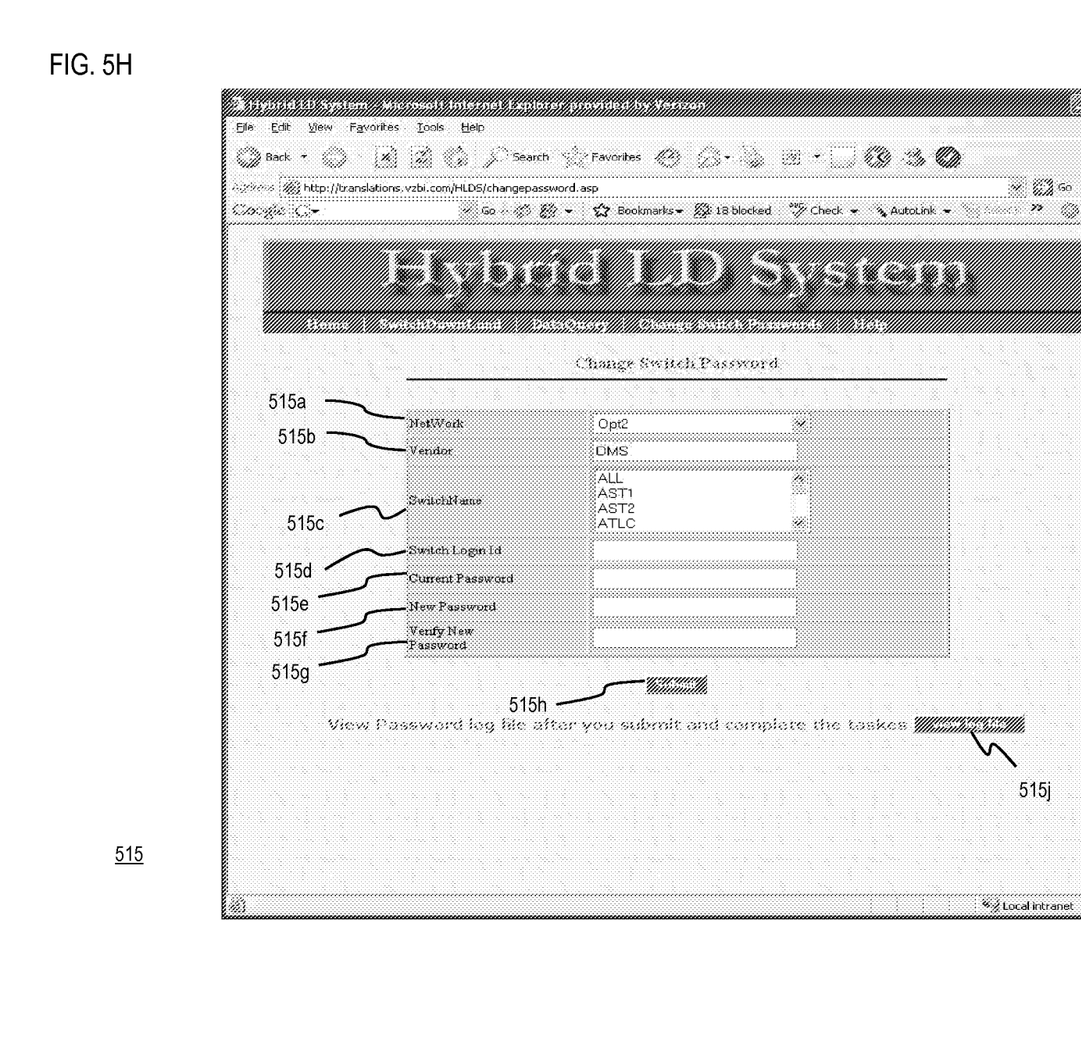

FIG. 5H depicts an optional screen 515 for the user to manage passwords to access the switches 103a-103n. Accordingly, the Change Switch Password screen 515 includes sections to identify the particular switch: a Network switch 515a, a Vendor section 515b, and a Switch Name section 515c. Also, screen 515 utilizes a Switch Login ID section 515d for the user to input a user identifier. Sections 515e and 515f allow the user to provide the current password and a new password, respectively. This new password is then verified with a Verify New Password section 515g. Upon filling in the sections 515a-515g, the user can submit the request for changing the password. In one embodiment, a View Log File button 515j provides a status report of the password changes for the switches 103a-103n.

The above process, according to certain embodiments, advantageously provides an efficient, automated mechanism for configuring network elements in support of VoIP services.

The processes described herein for configuring a distributed switching system may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
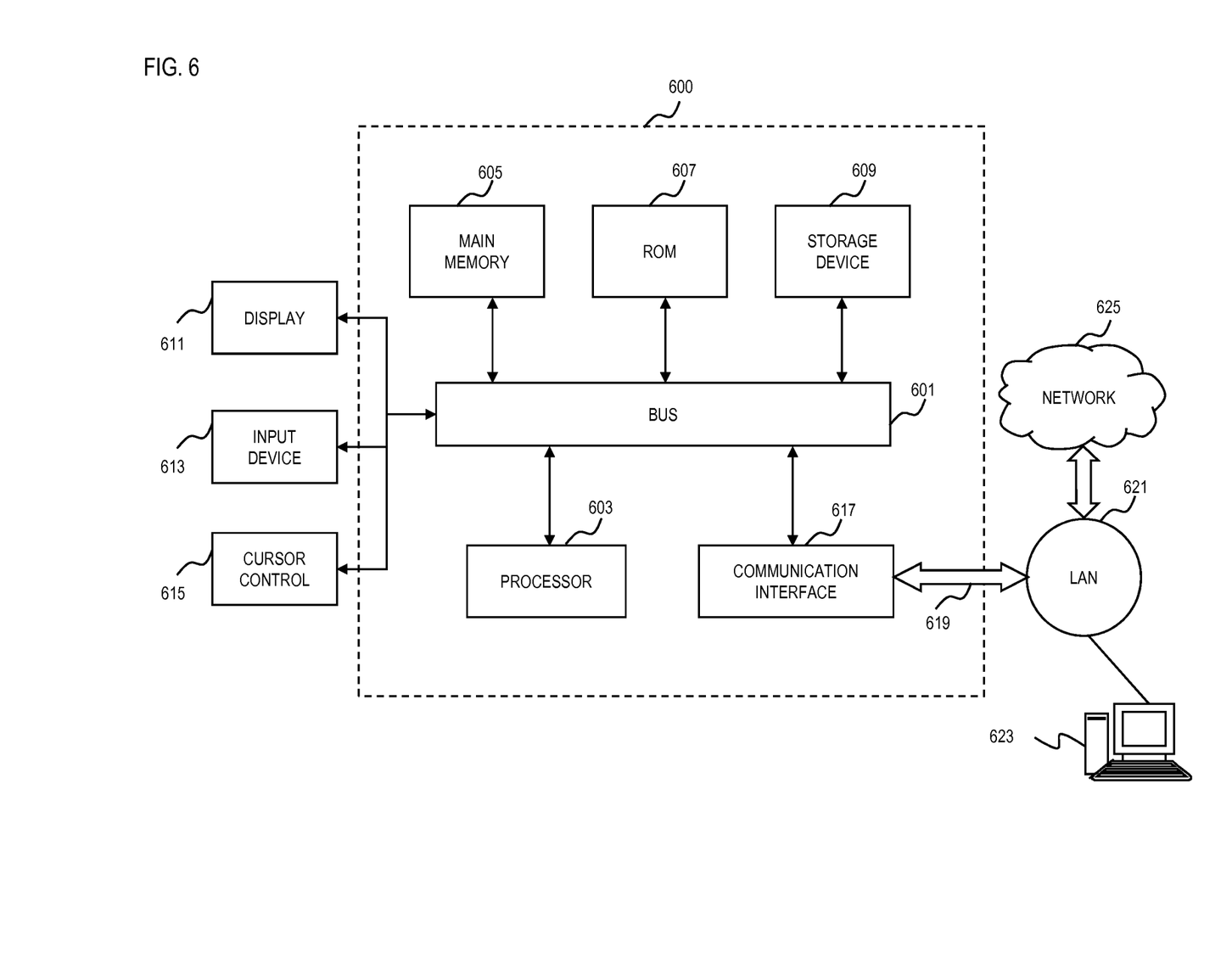
FIG. 6 is a diagram of a computer system that can be used to implement various exemplary embodiments.

FIG. 6 illustrates computing hardware (e.g., computer system) upon which an embodiment according to the invention can be implemented. The computer system 600 includes a bus 601 or other communication mechanism for communicating information and a processor 603 coupled to the bus 601 for processing information. The computer system 600 also includes main memory 605, such as random access memory (RAM) or other dynamic storage device, coupled to the bus 601 for storing information and instructions to be executed by the processor 603. Main memory 605 also can be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    polling a plurality of nodes within a network for configuration information, wherein the nodes are configured to establish voice sessions;
    correlating the configuration information;
    presenting a view of the nodes and associated circuits to a user for configuring one or more of the nodes based on the correlation; and
    receiving input from the user specifying a first level of granularity associated with components and circuits corresponding to the nodes.

2. A method according to claim 1, wherein the voice sessions are packetized.

3. A method according to claim 2, wherein the nodes include a hybrid switch.

4. A method according to claim 1, wherein the view is presented using a web interface to the user.

5. A method according to claim 4, wherein the web interface provides a data collection screen that includes,
    a user identifier section for specifying an identifier of the user,
    a password section for specifying a password to logging into a particular one of the nodes,
    a table name section for specifying a table corresponding to trunk groups associated with the particular node,
    a network identifier section for specifying an identifier of the network, and
    a node name section for specifying a name of the particular node.

6. A method according to claim 1, wherein each of the nodes includes a core and a plurality of gateway controllers for controlling a plurality of packet voice gateways to establish the voice sessions.

7. A method according to claim 6, further comprising:
    determining a relationship of the core, the gateway controllers, and the packet voice gateways; and
    storing the configuration information based on the determined relationship.

8. A method according to claim 1, wherein the view is presented using a web interface to the user, the web interface providing a query screen for viewing the packet voice gateways.

9. A system comprising:
    a plurality of nodes configured to establish digital voice sessions; and
    a platform configured to:
        poll the nodes for configuration information,
        correlate the configuration information,
        present a view of the nodes and associated circuits to a user for configuring one or more of the nodes based on the correlation in response to a command by the user, and
        receive input, via a web browser, from the user specifying a first level of granularity associated with components and circuits corresponding to the nodes.

10. A system according to claim 9, wherein the voice sessions are packetized.

11. A system according to claim 10, wherein the nodes include a hybrid switch.

12. A system according to claim 9, wherein the view is presented using a web interface to the user.

13. A system according to claim 12, wherein the web interface provides a data collection screen that includes,
    a user identifier section for specifying an identifier of the user,
    a password section for specifying a password to logging into a particular one of the nodes,
    a table name section for specifying a table corresponding to trunk groups associated with the particular node,
    a network identifier section for specifying an identifier of the network, and
    a node name section for specifying a name of the particular node.

14. A system according to claim 9, wherein each of the nodes includes a core and a plurality of gateway controllers for controlling a plurality of packet voice gateways to establish the voice sessions.

15. A system according to claim 14, wherein the platform is further configured to:
    determine a relationship of the core, the gateway controllers, and the packet voice gateways; and
    store the configuration information based on the determined relationship.

16. A system according to claim 9, wherein the view is presented using a web interface to the user, the web interface providing a query screen for viewing the packet voice gateways.

* * * * *